US010273830B2

(12) United States Patent
Holland et al.

(10) Patent No.: US 10,273,830 B2
(45) Date of Patent: Apr. 30, 2019

(54) REPLACING AN APERTURE WITH AN ANNULAR BUSHING IN A COMPOSITE LAMINATED COMPOSITE COMPONENT

(71) Applicant: United Technologies Corporation, Hartford, CT (US)

(72) Inventors: Brian K. Holland, Lansing, MI (US); Jeffrey Denton, Jackson, MI (US); William Bogue, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 333 days.

(21) Appl. No.: 14/909,391

(22) PCT Filed: Aug. 19, 2014

(86) PCT No.: PCT/US2014/051651
§ 371 (c)(1),
(2) Date: Feb. 1, 2016

(87) PCT Pub. No.: WO2015/026798
PCT Pub. Date: Feb. 26, 2015

(65) Prior Publication Data
US 2016/0186609 A1 Jun. 30, 2016

Related U.S. Application Data

(60) Provisional application No. 61/867,890, filed on Aug. 20, 2013.

(51) Int. Cl.
*F01D 25/24* (2006.01)
*B29C 73/06* (2006.01)
(Continued)

(52) U.S. Cl.
CPC ............ *F01D 25/243* (2013.01); *B29C 73/06* (2013.01); *F02C 7/00* (2013.01); *F16B 5/0088* (2013.01);
(Continued)

(58) Field of Classification Search
CPC ........... B29C 73/06; B64C 1/12; B64D 29/06; F01D 25/005; F01D 25/24; F01D 25/243;
(Continued)

(56) References Cited

U.S. PATENT DOCUMENTS 3,345,900 A * 10/1967 Villo ................... F16B 19/1063
411/41
4,244,661 A * 1/1981 Dervy ....................... F16B 5/01
403/243
(Continued)

FOREIGN PATENT DOCUMENTS

DE 102012015183 A1 * 2/2013 ................ F16B 5/04
DE 102011122449 A1 6/2013
GB 1174923 A * 12/1969 ............... B64C 1/12

OTHER PUBLICATIONS

EP search report for EP14838458.9 dated Aug. 10, 2016.

Primary Examiner — Josh Skroupa
(74) Attorney, Agent, or Firm — O'Shea Getz P.C.

(57) ABSTRACT

An annular bushing includes an annular cylindrical portion with a flange that defines a fastener aperture along an axis. A multiple of spacers extend from an outer surface of the annular cylindrical portion and the flange. The multiple of spacers are operable to control a bond line thickness.

8 Claims, 9 Drawing Sheets

(51) Int. Cl.
  *F16B 5/04*   (2006.01)
  *F16B 5/00*   (2006.01)
  *F16B 43/00*  (2006.01)
  *F02C 7/00*   (2006.01)
  *F16B 5/01*   (2006.01)
  *F16B 11/00*  (2006.01)
  *B29C 73/26*  (2006.01)

(52) U.S. Cl.
  CPC ............... *F16B 5/04* (2013.01); *F16B 43/00* (2013.01); *B29C 2073/268* (2013.01); *F05D 2230/80* (2013.01); *F05D 2260/31* (2013.01); *F05D 2300/603* (2013.01); *F16B 5/01* (2013.01); *F16B 11/006* (2013.01); *Y10T 403/335* (2015.01)

(58) Field of Classification Search
  CPC ...... F02C 7/00; F05D 2260/31; F16B 5/0056; F16B 5/0088; F16B 5/01; F16B 5/04; F16B 5/045; F16B 43/00; F16D 1/033; F16D 1/076; Y10T 403/33; Y10T 403/335; Y10T 403/3993; Y10T 403/4637; Y10T 403/645
  USPC .................. 403/167, 168, 201, 243, 337
  See application file for complete search history.

(56) References Cited

U.S. PATENT DOCUMENTS

| | | | |
|---|---|---|---|
| 4,830,558 A | 5/1989 | Sweeney | |
| 4,844,673 A * | 7/1989 | Kendall | F16B 19/1054 411/34 |
| 4,950,115 A * | 8/1990 | Sadri | F16B 19/1063 411/38 |
| 5,037,259 A * | 8/1991 | Duran | F16B 37/062 411/173 |
| 5,111,570 A | 5/1992 | Baumgarten et al. | |
| 5,238,342 A * | 8/1993 | Stencel | F16B 19/1036 411/329 |
| 5,275,529 A * | 1/1994 | Langenbrunner | F16B 5/01 244/132 |
| 5,350,264 A * | 9/1994 | Stencel | F16B 19/1063 411/38 |
| 5,437,750 A * | 8/1995 | Rinse | B29C 65/08 156/293 |
| 5,682,678 A | 11/1997 | Gallagher et al. | |
| 6,036,418 A * | 3/2000 | Stencel | F16B 19/1063 411/38 |
| 6,370,752 B1 | 4/2002 | Anderson et al. | |
| 6,988,862 B1 | 1/2006 | Iguchi et al. | |
| 7,308,842 B2 * | 12/2007 | Hufnagl | B25B 23/1415 411/43 |
| 8,197,191 B2 * | 6/2012 | Binks | F16B 33/004 411/361 |
| 8,262,331 B2 * | 9/2012 | Toosky | F16B 33/004 411/361 |
| 8,322,015 B2 * | 12/2012 | Pratt | F16B 19/1063 29/525.01 |
| 8,777,533 B2 * | 7/2014 | Hufnagl | F16B 19/1072 411/55 |
| 8,777,537 B2 * | 7/2014 | Fritsch | F16B 5/02 411/338 |
| 8,932,418 B2 * | 1/2015 | Jendrny | B21J 15/02 156/253 |
| 8,979,453 B2 * | 3/2015 | Hufnagl | F16B 19/1072 411/34 |
| 9,969,499 B2 * | 5/2018 | Caruel | B64D 29/06 |
| 2008/0063889 A1 | 3/2008 | Duckham et al. | |
| 2008/0093418 A1 | 4/2008 | Weihs | |
| 2008/0110962 A1 | 5/2008 | Saxena | |
| 2008/0272181 A1 | 11/2008 | Wang | |
| 2008/0299410 A1 | 12/2008 | Duckham | |
| 2008/0314735 A1 | 12/2008 | Weihs | |
| 2009/0053006 A1 * | 2/2009 | Hufnagl | F16B 19/1054 411/34 |
| 2009/0065554 A1 | 3/2009 | van Heerden | |
| 2009/0173626 A1 | 7/2009 | Duckham | |
| 2009/0186195 A1 | 7/2009 | Spraker | |
| 2009/0208691 A1 | 8/2009 | Whitworth et al. | |
| 2009/0242615 A1 | 10/2009 | Saxena | |
| 2010/0077690 A1 * | 4/2010 | Durand | B64C 1/12 52/578 |
| 2012/0272637 A1 | 11/2012 | Holland et al. | |
| 2012/0301286 A1 | 11/2012 | Boletis et al. | |
| 2013/0189054 A1 | 7/2013 | Diehl et al. | |

* cited by examiner

REPLACING AN APERTURE WITH AN ANNULAR BUSHING IN A COMPOSITE LAMINATED COMPOSITE COMPONENT

CROSS-REFERENCE TO RELATED APPLICATION

This application claims priority to PCT Patent Application No. PCT/US2014/051651 filed Aug. 19, 2014, which claims priority to U.S. Patent Application No. 61/867,890 filed Aug. 20, 2013, which are hereby incorporated by reference in their entireties.

BACKGROUND

This disclosure relates generally to laminated components and, more particularly, to replacing an aperture in a laminated component.

Composite laminated structures typically include one or more plies of compressed reinforcement fabric layers bonded together by a resin matrix, such as an epoxy. Many laminated components include apertures for fasteners such as rivets. In aerospace applications, the rivets are typically titanium.

Over time, the apertures in the composite laminated structures are prone to wear from vibration. The apertures may also sometimes be double drilled during manufacture. In either instance, the apertures are enlarged or otherwise misplaced which minimizes their effective receipt of the fastener.

Various techniques have been developed to replace deformed or misplaced apertures. For example, in some laminated components, the plies are peeled back, cut off, and replaced as a structural restoration. A new aperture is then machined into the laminated component. Although effective, this technique is relatively complex, expensive, and requires specific tooling and knowledge of parent component structure and/or design.

Another technique involves replacing the deformed aperture with a metal bushing. Although effective, this technique may result in an undesirable thermal coefficient of expansion mismatch with the laminated structure and/or create undesirable galvanic conditions at the mating interface. Further, conventional bushings require significant removal of currently intact material which may weaken the laminate.

Yet another technique involves application of epoxy resin to fill the space of the deformed aperture which is then machined to form a replacement aperture. Although effective, this technique may not be significantly robust in that voids are frequently observed which may result in premature failure of the repair material. Further, the epoxy resin matrix may not attain proper design requirements, e.g. strength to avoid fastener pull through.

SUMMARY

An annular bushing, according to one disclosed non-limiting embodiment of the present disclosure, includes an annular cylindrical portion with a flange that defines a fastener aperture along an axis. A multiple of spacers extend from an outer surface of the annular cylindrical portion and the flange. The multiple of spacers are operable to control a bond line thickness.

In a further embodiment of the present disclosure, the multiple of spacers includes a multiple of ribs generally parallel to the axis.

In a further embodiment of any of the foregoing embodiments of the present disclosure, the multiple of spacers include a helical rib.

In a further embodiment of any of the foregoing embodiments of the present disclosure, the flange defines an angle of about 100 degrees.

In a further embodiment of any of the foregoing embodiments of the present disclosure, the fastener aperture is countersunk.

In a further embodiment of any of the foregoing embodiments of the present disclosure, the annular cylindrical portion and the flange are manufactured from a polyimide material.

In a further embodiment of any of the foregoing embodiments of the present disclosure, the annular cylindrical portion and the flange are manufactured from a polyetherimide material.

A laminated composite assembly, according to another disclosed non-limiting embodiment of the present disclosure, includes an annular bushing bonded to a first laminated composite component. A fastener extends through the annular bushing to at least partially retains the first laminated composite component to the second component.

In a further embodiment of any of the foregoing embodiments of the present disclosure, the annular bushing is manufactured from a polyimide material.

In a further embodiment of any of the foregoing embodiments of the present disclosure, the annular bushing is manufactured from a polyetherimide material.

In a further embodiment of any of the foregoing embodiments of the present disclosure, the annular bushing is countersunk within the first composite laminate component.

In a further embodiment of any of the foregoing embodiments of the present disclosure, the fastener is countersunk within the annular bushing.

In a further embodiment of any of the foregoing embodiments of the present disclosure, the annular bushing is countersunk within the first laminated composite component and the fastener is countersunk within the annular bushing.

In a further embodiment of any of the foregoing embodiments of the present disclosure, the fastener is a rivet.

In a further embodiment of any of the foregoing embodiments of the present disclosure, the first laminated component is a gas turbine engine nacelle component.

In a further embodiment of any of the foregoing embodiments of the present disclosure, the first laminated component is a skin of a gas turbine engine nacelle.

A method of replacing an aperture in a laminated component, according to another disclosed non-limiting embodiment of the present disclosure, includes machining an aperture in place of a deformed aperture and bonding an annular bushing into the aperture. The annular bushing includes a multiple of spacers to control a bond line thickness between the annular bushing and the aperture.

In a further embodiment of any of the foregoing embodiments of the present disclosure, the method includes retaining the annular bushing within the countersunk aperture with a hole clamp during the bonding.

In a further embodiment of any of the foregoing embodiments of the present disclosure, the method includes countersinking the aperture.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
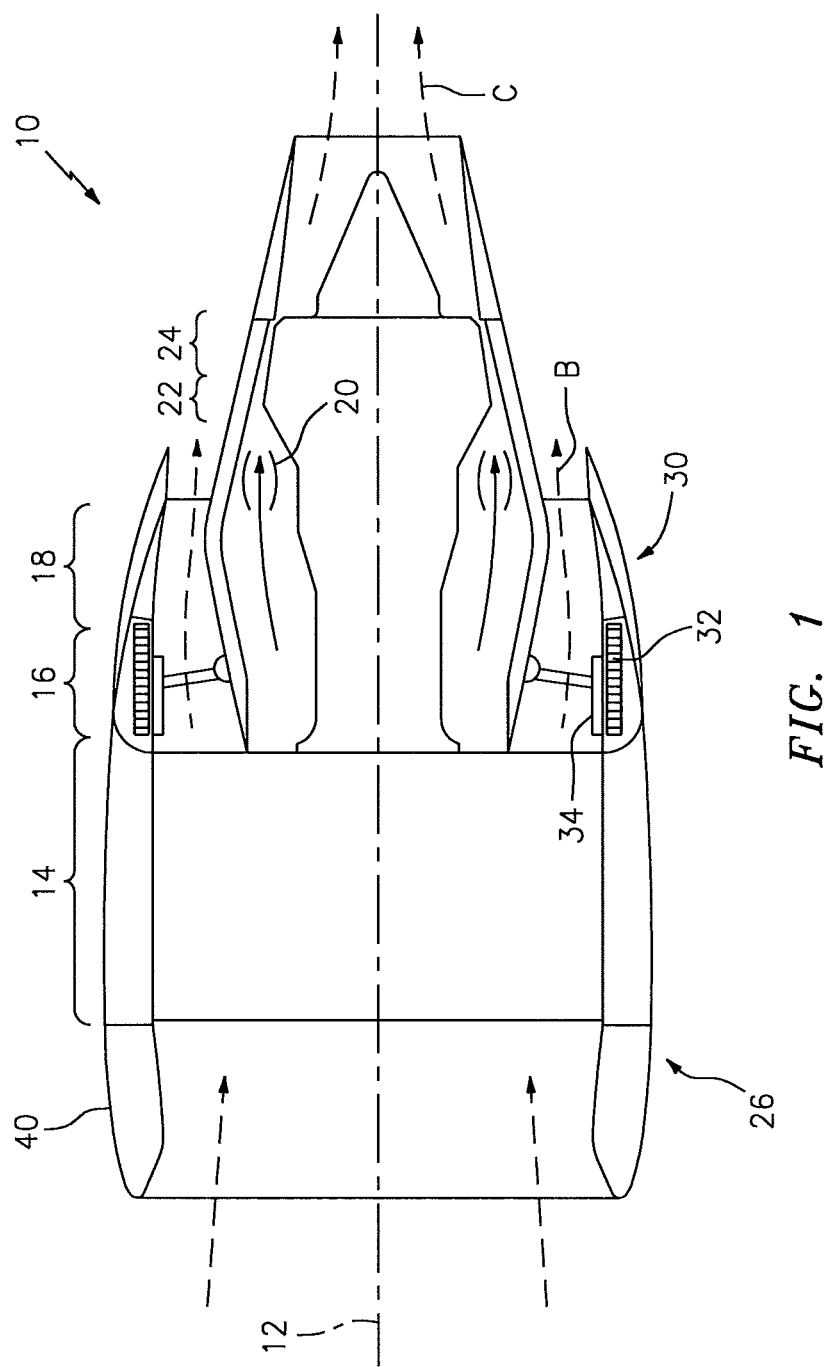
FIG. 1 is a schematic cross-section of an example gas turbine engine.

FIG. 1 schematically illustrates a gas turbine engine 10 circumferentially disposed about an axis 12. The gas turbine engine 10 includes a fan section 14, a low pressure compressor section 16, a high pressure compressor section 18, a combustion section 20, a high pressure turbine section 22, and a low pressure turbine section 24. Although depicted as a turbofan in the disclosed non-limiting embodiment, it should be understood that the concepts described herein are not limited to use with turbofans as the teachings may be applied to other types of turbine engines such as a geared architecture turbofan, a low bypass augmented turbofan, turbojets, turboshafts, and three-spool (plus fan) turbofans wherein an intermediate spool includes an intermediate pressure compressor. That is, there are various types of turbomachines, and other devices having laminated components, that can benefit from the examples disclosed herein.

During operation, air is compressed in the low pressure compressor section 16 and the high pressure compressor section 18. The compressed air is then mixed with fuel and burned in the combustion section 20. The products of combustion are expanded across the high pressure turbine section 22 and the low pressure turbine section 24.

The gas turbine engine 10 is received within a nacelle assembly 26, to establish a bypass flow path B and a core flow path C. A thrust reverser 30 (illustrated schematically) within the nacelle assembly 26 generally includes a multiple of cascade arrays 32 and blocker doors 34 which are selectively deployed into the bypass flow path 28 to provide a thrust reversing function.

Figure 2:
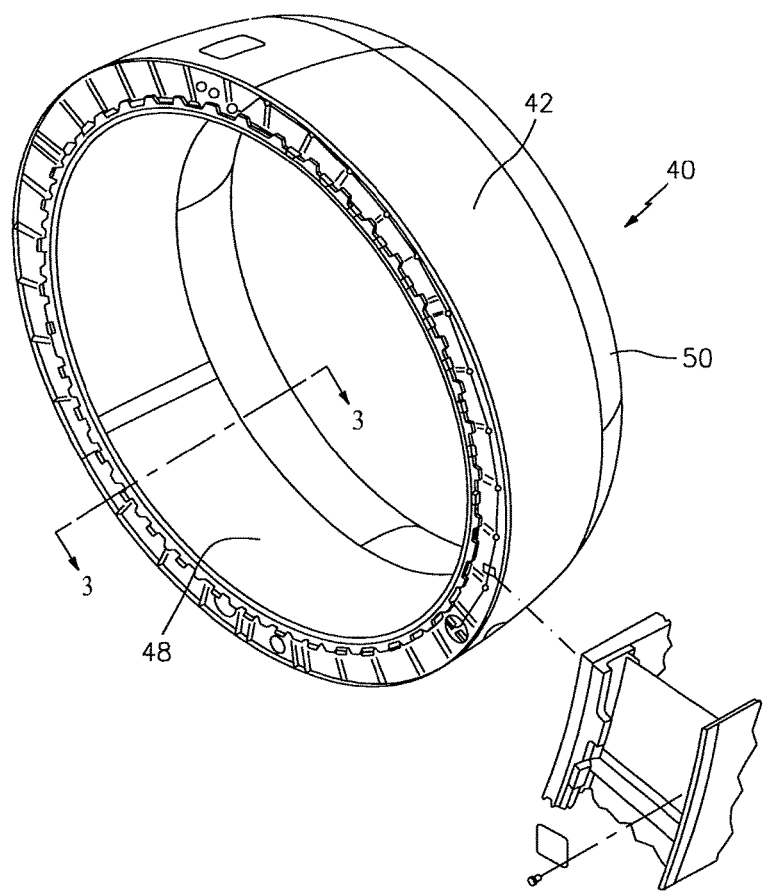
FIG. 2 is an expanded schematic view of a laminated composite component assembly.
Figure 3:
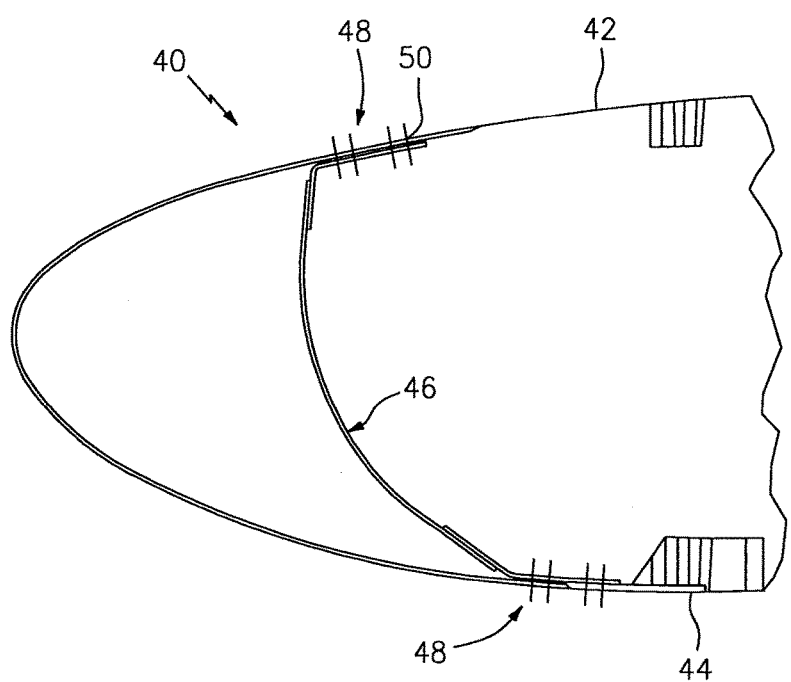
FIG. 3 is a sectional view of the laminated composite component assembly of FIG. 2.

The nacelle assembly 26 typically includes an intake cowl assembly 40 (see also FIGS. 2 and 3) with an outer component 42 and an inner component 44 that are attached to an inner bulkhead 46 with fasteners 48, e.g. rivets, screws, bolts, etc., through respective apertures 50. The components 42, 44 in the disclosed non-limiting embodiment may be manufactured of a laminated composite, such as of carbon fiber and epoxy while the rivets 48 are typically cherry rivets manufactured of titanium.

Figures 4, 4A:
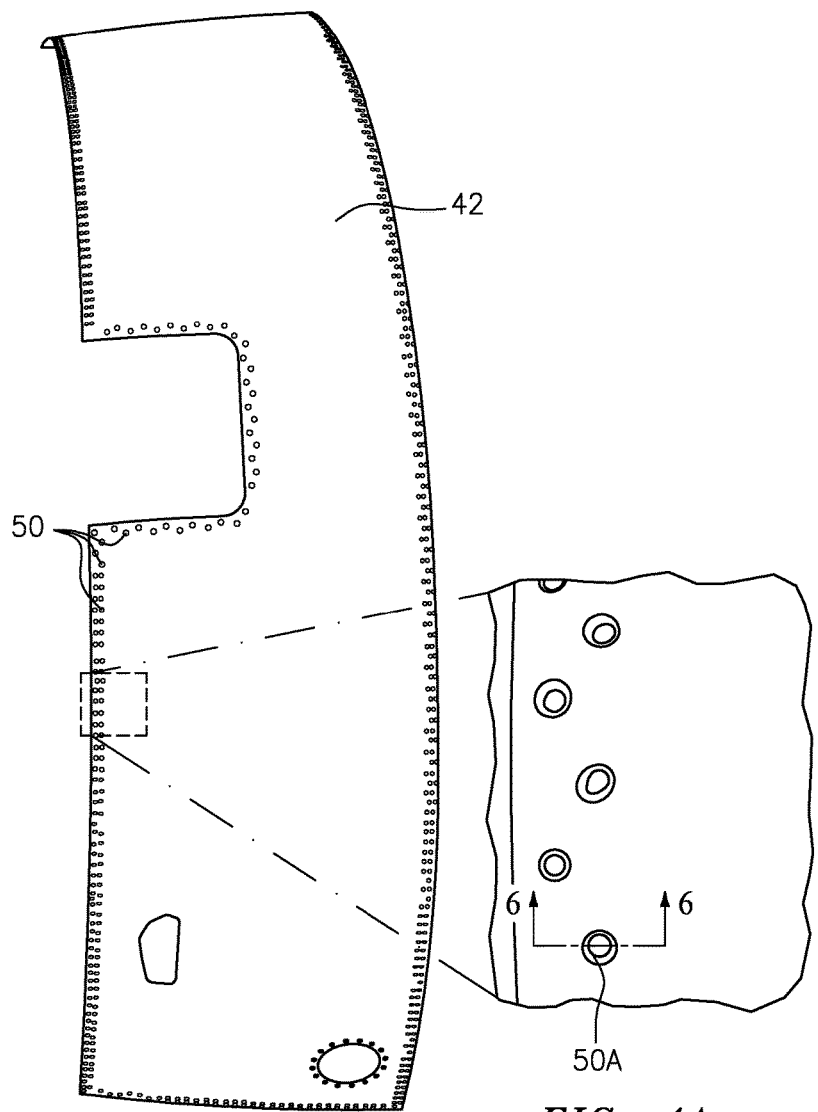
FIG. 4 is a perspective view of a laminated composite component of the laminated composite component assembly of FIG. 2.
FIG. 4A is an enlarged veiw of a portion of the laminated composite component of FIG. 4.

Over time, one or more of the apertures 50 which receive the fasteners 48 may become worn or damaged as shown in FIG. 4 because of, for example, mechanical fastener vibrations from engine operations. Although the outer component 42 is the example utilized herein for repair of the deformed aperture 50A, it should be appreciated that various composite laminates will benefit herefrom.

Figure 5:
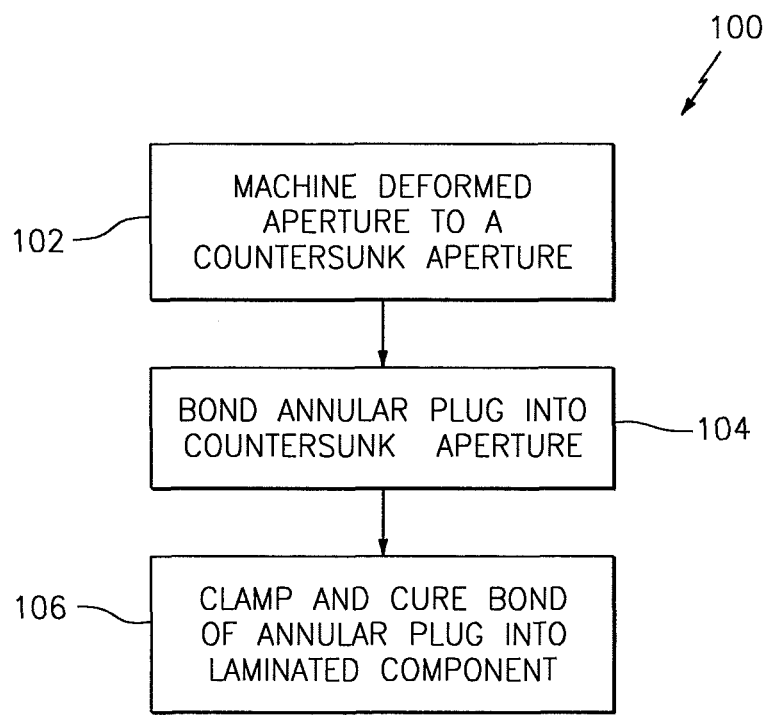
FIG. 5 is a block diagram of a method to repair a deformed aperture.
Figure 6:
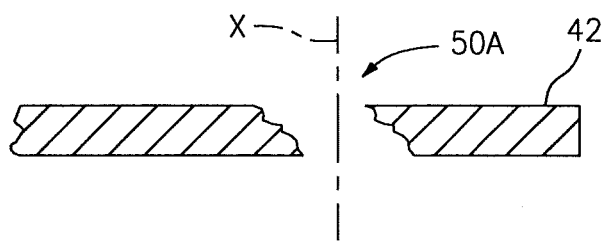
FIG. 6 is an expanded sectional view of a deformed aperture in the laminated composite component.
Figure 7:
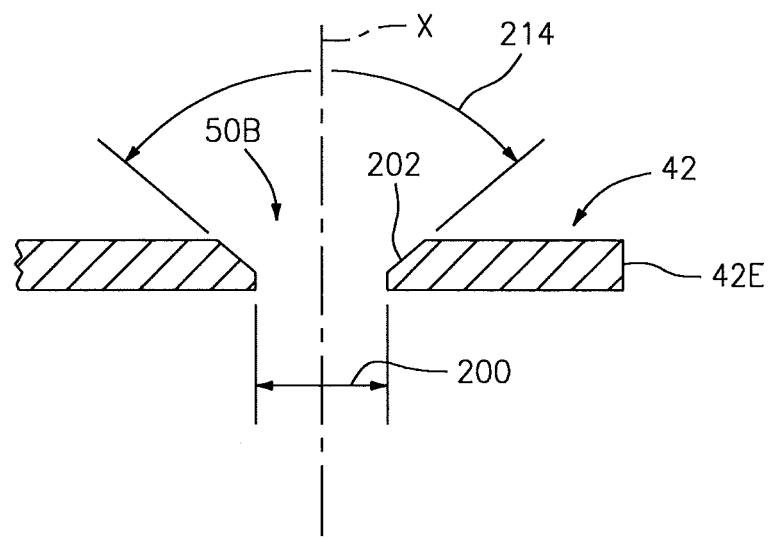
FIG. 7 is an expanded sectional view of the laminated composite component during an initial stage of the FIG. 5 replacing method.

With reference to FIG. 5, a method 100 for replacement of the non-conforming aperture 50A (FIG. 6) according to one disclosed non-limiting embodiment initially includes machining the non-conforming aperture 50A into a countersunk aperture 50B with a bore 200 and a chamfer 202 (step 102; FIG. 7). The countersunk aperture 50B is larger than the deformed aperture 50A. The countersink facilitates all layers of the laminate to participate in load carriage.

Generally, the center to center distance of multiple countersunk apertures 50B is 300% the diameter of the fastener 48 while a distance from an edge 42E of the components 42 to a center axis X of the countersunk aperture 50B is 200% the diameter of the fastener 48. It should be appreciated that although a flush head rivet (countersunk hole) are disclosed in the illustrated embodiment, non-countersunk interfaces for universal head rivets will also benefit herefrom. For composite laminates, the use of a spot face to make clearance for a T-Head ("top hat") bushing may not be desirable because the outer layers may be decoupled from the structure carrying the bearing stress.

Figure 9:
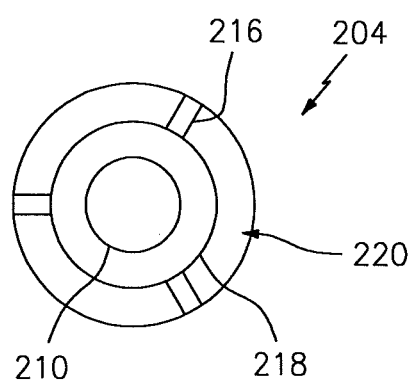
FIG. 9 is a bottom view of the annular bushing of FIG. 8.
Figure 10:
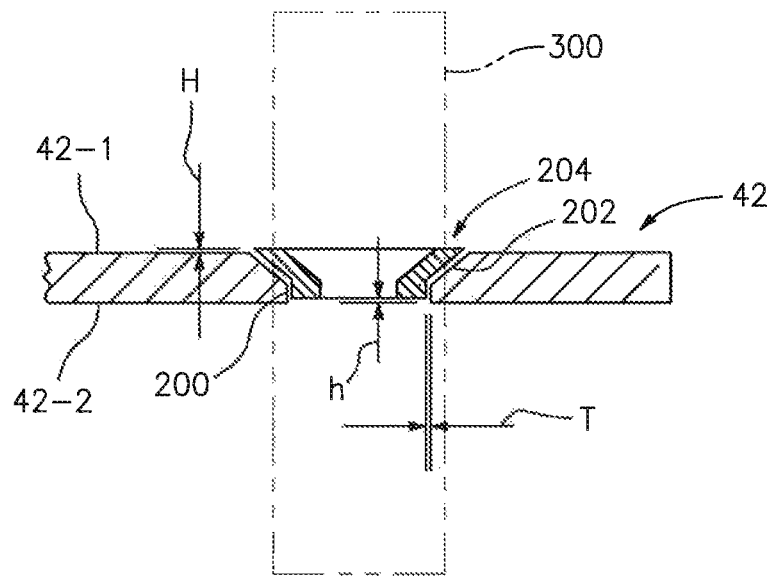
FIG. 10 is an expanded sectional view of the laminated composite component during a later stage of the FIG. 5 replacing method.

An annular bushing 204 (FIGS. 8 and 9) is then bonded into the enlarged countersunk aperture 50B (step 104; FIG. 10). The annular bushing 204 may be manufactured from a polyimide or polyetherimide material that is relatively inexpensive, relatively easily molded, has the required thermal capability, compression strength, and constructed of similar material to the parent substrate therefor eliminating undesirable effects, such as galvanic concerns. In one disclosed non-limiting embodiment, the annular bushing 204 has a usable temperature range of 400° F. (200°) as typical composite components are designed for 250° or 350° (250° C.-177° C.) systems.

Figure 8:
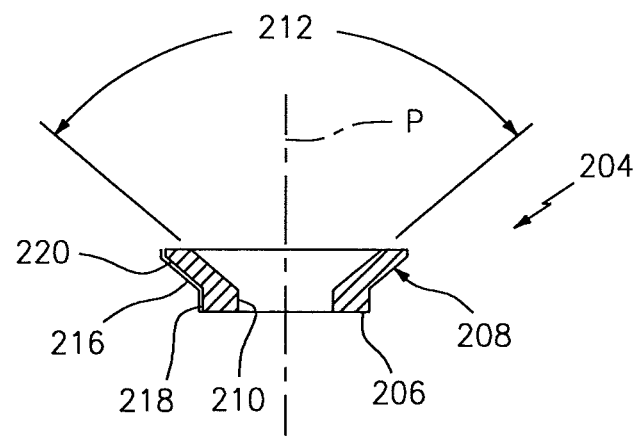
FIG. 8 is a sectional view of an annular bushing according to one disclosed non-limiting embodiment.

With reference to FIG. 8, the annular bushing 204 generally includes an annular cylindrical portion 206 and a flange 208 about a fastener aperture 210 that defines an axis P. The cylindrical portion 206, in one disclosed non-limiting embodiment, has a wall thickness of about 0.03 inch (0.8 mm) to facilitate integrity of the annular bushing 204. The flange 208 defines an angle 212 that corresponds with the angle 214 of the chamfer 202 (FIG. 7). The fastener aperture 210 may thereby be a countersunk aperture. In one disclosed non-limiting embodiment, the angles 212, 214 define an angle of about one hundred degrees (100°), however, other angles will benefit herefrom.

Figure 8A:
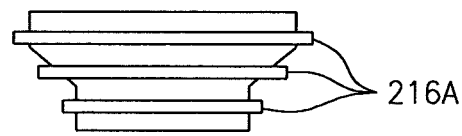
FIG. 8A is a sectional view of an annular bushing according to another disclosed non-limiting embodiment.

The annular bushing 204 further includes a multiple of spacers 216 (three shown in FIG. 9) on an outer surface 218 of the cylindrical portion 206 and an outer surface 226 of the flange 208. In one disclosed non-limiting embodiment, the multiple of spacers are generally longitudinal ribs generally protrude normal to the outer surface 218. In another disclosed non-limiting embodiment, the multiple of spacers 216A may alternatively or additionally include circumferential ribs that would limit flow of the adhesive by containing the displacement flow during installation and cure (FIG. 8A). It should be appreciated that the viscosity of many adhesives lowers from nominal room temperature values during elevated temperature cures and are capable of evacuating from the bond line.

Figure 8B:
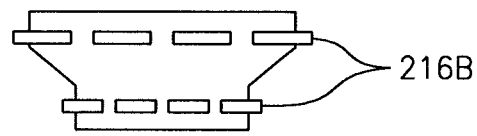
FIG. 8B is a sectional view of an annular bushing according to another disclosed non-limiting embodiment.

In another disclosed non-limiting embodiment, the multiple of spacers 216B may alternatively or additionally include interrupted circumferential rings (FIG. 8B) which allow a metered control of the adhesive flow. It should be appreciated that the interruptions may be aligned from ring to ring or may be staggered to resist lower viscosity effects in the adhesive.

Figure 8C:
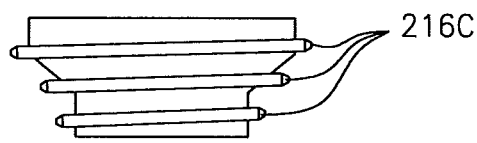
FIG. 8C is a sectional view of an annular bushing according to another disclosed non-limiting embodiment.

In another disclosed non-limiting embodiment, the multiple of spacers 216C may alternatively or additionally include helical rings (FIG. 8C) that operate to resist lower viscosity effects in the adhesive. It should be appreciated that the helical rings may be continuous or interrupted. Furthermore, the thread pitch may be defined to provide a minimum of one full turn an may be no more than on-third the area on the outer surface 218 of the cylindrical portion 206 and the outer surface 226 of the flange 208.

Figure 8D:
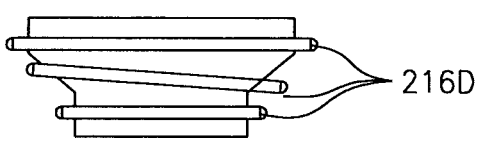
FIG. 8D is a sectional view of an annular bushing according to another disclosed non-limiting embodiment.

In another disclosed non-limiting embodiment, the multiple of spacers 216D may alternatively or additionally include counter-directional helical rings (FIG. 8D). The counter-directional helical rings facilitate mechanical engagement for materials that may be relatively difficult to bond.

It should be appreciated that various spacers may be utilized and that injection or compression moldable non-metallic annular bushings 204 with such spacers are readily formed to profile with no need to secondary machining.

With reference to FIG. 10, the multiple of spacers 216 operate to control bond line thickness T. That is, the spacers 216 space the annular bushing 204 from the bore 200 and the chamfer 202 to provide an effective bond receipt area therebetween. For example, an adhesive such as epoxy or Room Temperature Vulcanizing (RTV) silicone may have an optimal bond line thickness of about 0.005-0.030 inches (0.127-0.762 mm) so the spacers 216 may be, for example, about 0.01 inches (0.25 mm) thick to provide the desired bond line thickness.

The annular bushing 204 may be secured during the bond step 104 with a device to maintain a predetermined constant pressure at the mating surface, such as a hole clamp 300 (illustrated schematically) otherwise known as a "cleco" clamp. The spacers 216 thereby maintain the desired bond thickness irrespective of the force applied by the device to facilitate efficient assembly.

Bonding of the annular bushing 204 may further include surface preparation. As the surface is expected to be as-molded, there may be a skin and/or mold release on the bushing bond surface that may be prepared by conventional abrasive blast, and/or a primer applied to the prepared surface. Further, various surface chemistry modification treatments to improve bondability include but are not limited to chemical etch, corona etch or plasma etch as well as application of a coupling layer to the freshly etched layer to improve adhesion and/or shelf life of the modified surface. This may take the form of a primer as above or a plasma deposited layer. The aforementioned, "as-molded" may also apply to creation of a relatively rough surface on the outer face of the annular bushing. Substrates may vary in design from large tow weaves with thick strands or small tow weaves with narrow strands. The mating surface may benefit to be molded as a discontinuous surface, such as dimpling to ensure proper mating surface engagement.

The annular bushing 204 further defines a height less than a thickness of the outer component 42. That is, the annular bushing 204 may be sized to extend above an outer surface 42-1 of the outer component for a distance h by which a lower surface 222 of the annular bushing 204 is recessed.

Figure 11:
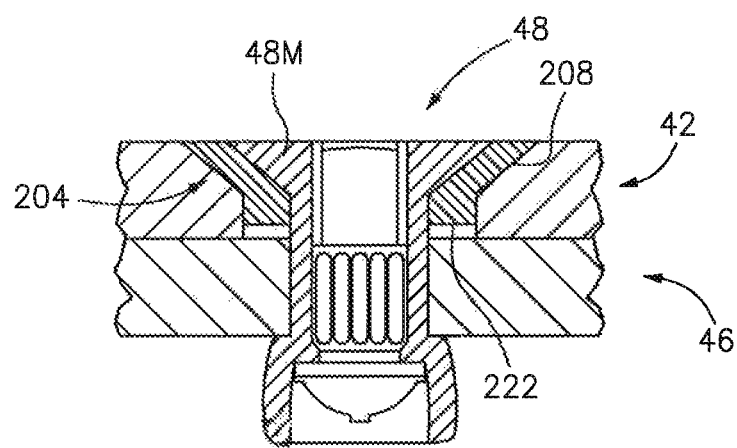
FIG. 11 is a sectional view of the laminated composite component with the annular bushing and a fastener installed therein.

With reference to FIG. 11, the annular bushing 204 is operable to receive the fastener 48 such as a cherry rivet to, for example, retain the outer component 42 to the inner bulkhead 46. Alternatively, the lubricity of the annular bushing 204 can be greater than that of the base laminate and use of MoS2 and graphite in the injection/compression molded non-metallics will mitigate fretting by the fastener 48.

The flange 208 of the annular bushing 20 advantageously carries the load from a manufactured head 48M of the fastener 48, in this example, while the inner bulkhead 46 carries the load from an upset head 48U of the fastener 48. That is, the annular bushing 20 need not extend the full thickness of the outer component 42 such that the load from the manufactured head 48M is directed through the flange 208 and into the outer component 42. That is, the lower surface 222 does not apply a load to the inner bulkhead 46 when the fastener is seated.

The annular bushing 204 may be readily utilized by various composite components that are riveted, as hole wear is readily common in the aerospace industry and other industries that use composite components retained by rivets.

The annular bushing 204 may be manufactured for use with particular rivet sizes and prepositioned for the disclosed repair procedure. In the aerospace industry, the common rivet sizes are 3, 4, 5, 6, and 8 such that an annular bushing 204 may be defined for each and prepositioned for ready on-wing repairs.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A laminated composite intake cowl of a nacelle assembly, the assembly comprising:
    a first laminated composite component;
    a second component;
    a third component that is a laminated composite component;
    an annular bushing bonded to the first laminated composite component;
    a second annular bushing bonded to the third component;
    a fastener through the annular bushing to at least partially retain the first laminated composite component to the second component;
    a second fastener through the second annular bushing to at least partially retain the third component to the second component,
    wherein the first laminated composite component is an outer component,
    wherein the second component is a bulkhead, and
    wherein the third component is an inner component,
    wherein a first surface of the annular bushing extends above a first surface of the first laminated composite for a distance by which a second surface of the annular bushing is recessed relative to a second surface of the first laminated composite component.

2. The assembly as recited in claim 1, wherein the annular bushing is manufactured from a polyimide material.

3. The assembly as recited in claim 1, wherein the annular bushing is manufactured from a polyetherimide material.

4. The assembly as recited in claim 1, wherein the annular bushing is countersunk within the first composite laminate component.

5. The assembly as recited in claim 1, wherein the fastener is countersunk within the annular bushing.

6. The assembly as recited in claim 1, wherein the annular bushing is countersunk within the first laminated composite component and the fastener is countersunk within the annular bushing.

7. The assembly as recited in claim 1, wherein the fastener is a rivet.

8. The assembly as recited in claim 1, wherein the first laminated component is a skin of a gas turbine engine nacelle.

* * * * *